June 23, 1964 P. L. DI MATTEO 3,138,761

ELECTRONIC MEMORY CIRCUIT UTILIZING FEEDBACK

Filed Feb. 7, 1961

INVENTOR.
PAUL L. DI MATTEO
BY George L. Black
AGENT 3,138,761
ELECTRONIC MEMORY CIRCUIT UTILIZING FEEDBACK Paul L. Di Matteo, Levittown, N.Y., assignor to Dynell Electronics Corporation, Plainview, N.Y., a corporation of New York Filed Feb. 7, 1961, Ser. No. 87,648
12 Claims. (Cl. 328—121)

The present invention relates to memory circuits, and more particularly to a feedback memory system utilizing digital and analogue techniques.

In memory systems presently known in the art, analogue information is remembered by converting it into digital information that can be stored for an infinite period of time. When it is desired to use the information, it must be converted back into analogue form. This requires the use of both analogue-to-digital and digital-to-analogue conversion means.

It is a primary object of the present invention to provide a memory circuit that receives analogue information and responds instantaneously to remember the information indefinitely in analogue form.

It is another object to provide a memory circuit which does not require the use of both analogue-to-digital and digital-to-analogue conversion means.

It is a further object to provide improved means for remembering instantaneously and indefinitely the magnitude of a received D.C. voltage signal that is applied to said means.

It is yet another object to provide improved means for remembering instantaneously and indefinitely the time difference between a reference pulse and a position trigger pulse signal that is applied to said means.

The foregoing and other objects and advantages of the invention, which will become more apparent from the accompanying drawings and detailed description thereof, are achieved by a gated detector having two inputs and one output across which a capacitor is connected. A recurrent sweep voltage is applied to one input. A monostable gate generator is connected to the second input. A feedback loop comprising a plurality of digital circuits is connected between the capacitor and the input of the monostable gate generator. If a D.C. input signal is inserted into the feedback loop at one point, or a position trigger pulse signal is inserted at another point, the capacitor is charged instantaneously to a voltage that is related to the magnitude of the D.C. input signal or the time difference between the position pulse signal and a reference timing pulse. After the signal is inserted, the feedback loop ensures that the voltage stored by the capacitor remains constant for an indefinite period of time.

Referring now to the drawings.

Figure 1:
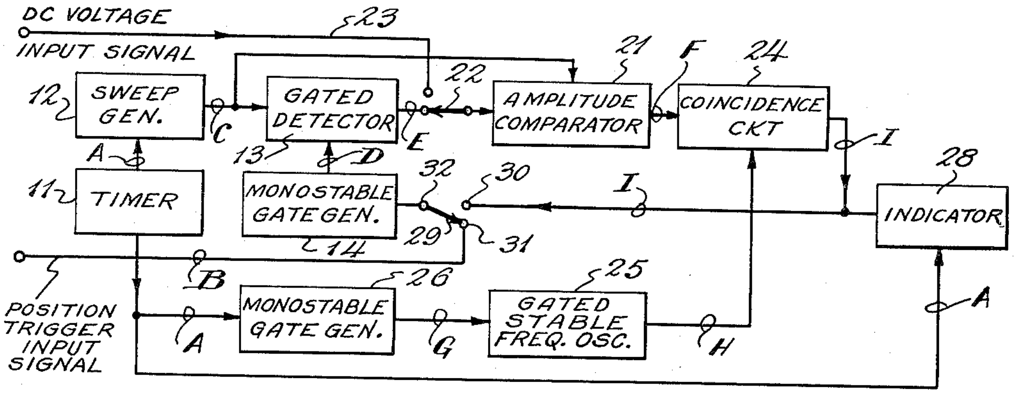
FIG. 1 is a block diagram of a preferred embodiment of a memory system in accordance with the present invention.

Referring to FIG. 1, 11 is a conventional timer such as employed in pulse radar systems for producing a series of recurrent trigger pulses having a predetermined repetition rate of constant frequency. The trigger pulses are of positive polarity, for example, and are depicted by the waveform A shown in FIG. 2.

One of the outputs of timer 11 is used for triggering a sweep generator 12, which produces a positive going sweep for each trigger pulse. The duration of the sweep is slightly less than the pulse repetition time of the trigger pulses. The sweep voltage waveform is depicted by the waveform C in FIG. 2, and is produced preferably by a low impedance sweep circuit such as a bootstrap sweep generator, for example.

The sweep voltage waveform C is applied to a first input of a gated detector 13. The second input of detector 13 is connected to the output of a monostable gate generator 14.

The generator 14 is a conventional monostable blocking oscillator, for example, which produces a positive output pulse of short duration each time its input is triggered. The output of generator 14 is depicted by the waveform D in FIG. 2. Each pulse of waveform D is a rectangular pulse whose amplitude is at least as large as the peak amplitude of waveform C. Also, each pulse of waveform D should be extremely narrow relative to the period of waveform C. The triggering of the gate generator 14 is explained further below.

Figure 2:
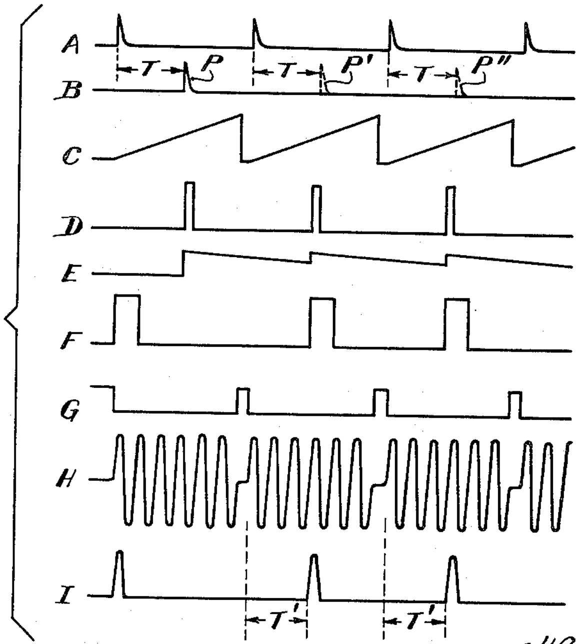
FIG. 2 is an illustration of the waveforms that occur at various points in the system shown in FIG. 1.

The gated detector 13 is a circuit for producing a D.-C. output voltage at the moment a pulse of waveform D is produced. The peak amplitude of the gated detector output, which is depicted by the waveform E in FIG. 2, is equal to the instantaneous value of the amplitude of waveform C at the moment a pulse of waveform D occurs.

A series-diode bidirectional gate is an example of a circuit that may be used for the gated detector 13. Such a circuit is illustrated in FIG. 3, and is described on pages 453 and 454 of the book entitled "Pulse and Digital Circuits," by Millman and Taub, published in 1956 by the McGraw-Hill Book Company, Inc.

Figures 3, 4:
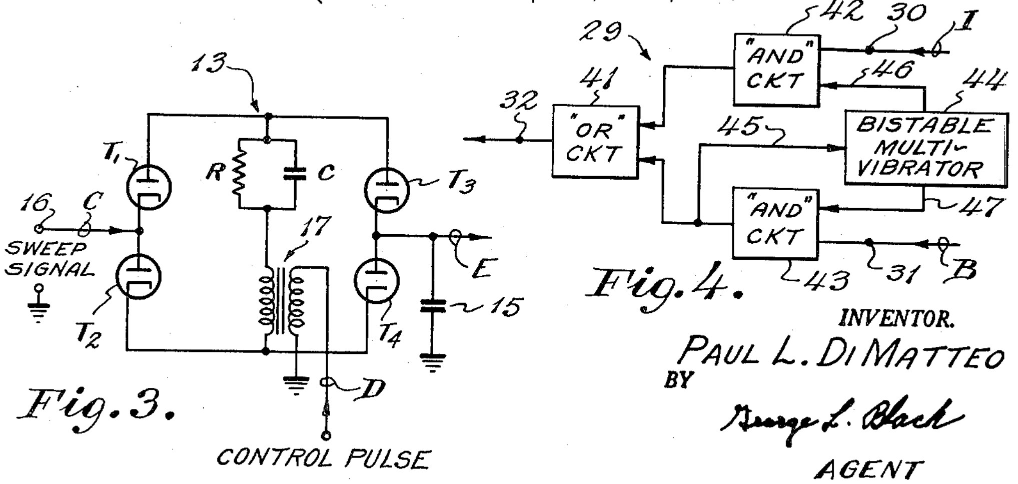
FIG. 3 is a schematic diagram of a gated detector that may be used in the system of FIG. 1.
FIG. 4 is a block diagram of an electronic switch that may be used in the system shown in FIG. 1.

The circuit shown in FIG. 3 is substantially the same as that shown in FIGS. 14–28 of the above book, except that a capacitor 15 is used across the output of the circuit instead of a resistor. The capacitor 15 stores a voltage equal to the instantaneous amplitude of the sweep waveform signal C applied to the signal input terminal 16, at the moment a control pulse of waveform D is applied to the primary winding of the transformer 17. The value of capacitor 15 should be small so that it charges rapidly and yet sufficiently large so that negligible decay will take place during a time interval equal to the time separation of two successive pulses of waveform A.

Referring again to FIG. 1, the output voltage from the gated detector is supplied to the first input of an amplitude comparator 21 by a switch 22. This switch is employed for connecting the first input of comparator 21 to a signal input lead 23 when it is desired to remember the magnitude of a D.C. voltage input signal from means, not shown. Switch 22 is a mechanical switch or its electronic equivalent.

The comparator 21 may be similar to the circuit shown in FIG. 15–22 and described on pages 481–484 of Millman and Taub, except that the reference voltage input terminals and the signal voltage terminals are reversed for a positive sweep voltage. The comparator has a second input for receiving the sweep voltage waveform C. At the moment the sweep voltage waveform C rises to a value equal to the reference voltage at the first input of the comparator, an output gate pulse is produced. The output of comparator 21 is a rectangular pulse, and is depicted by the waveform F in FIG. 2. The width of each pulse of waveform F is narrow relative to the repetition time of the pulses of waveform A.

A coincidence circuit 24 has a first input for receiving the output waveform of comparator 21. A second input is connected to a phase locked gated stable frequency oscillator 25, which produces a waveform H as depicted in FIG. 2.

The oscillator 25 is a pulsed Hartley oscillator as shown in FIG. 16–21 and described on pages 505 and 506 of Millman and Taub, for example. It produces a series of recurrent pulses of sinusoidal oscillations during negative gating pulses produced at the output of a monostable gate generator 26. The gating pulses are depicted by waveform G in FIG. 2. The output of oscillator 25 is shown by waveform H. The period of the sinusoidal oscillations is equal to or less than the duration of the pulses of waveform F. The polarity of these oscillations is the same at the beginning of each negative pulse of waveform G.

The generator 26 may be a conventional monostable multivibrator, for example, which produces a gating pulse each time it is triggered by a positive trigger pulse of waveform A from the timer 11. The duration of each of the pulses of waveform G is slightly less than the repetition time of the trigger pulses of waveform A.

The coincidence circuit 24 is an "And" circuit, such as used often in pulse and digital circuits and described on page 398 of Millman and Taub, for example. It has a single output at which a pulse appears if and only if the positive half of an oscillation of waveform H occurs simultaneously with one of the positive gate pulses of waveform F. This output is depicted by the waveform I in FIG. 2. The pulses of waveform I occur only during the time interval that a pulse of waveform F overlaps the positive half cycle of an oscillation of waveform H.

The output of the coincidence circuit 24 is supplied to input terminal 30 of a switch 29. An output terminal 32 of the switch 29 is connected to the input of the monostable gate generator 14. If switch 29 connects terminals 30 and 32, it completes a feedback loop from the output to the input of the gated detector 13. If switch 29 is connected to an input terminal 31, as it is shown in FIG. 1, it is in the required operating state for inserting a position trigger input signal P of waveform B into the system for remembering the delay time T between such a signal and a reference pulse of waveform A.

The switch 29 might be either a mechanical or an electronic switch. One example of an electronic switch which might be used for inserting the position trigger P into the system is shown in FIG. 4. Here, the terminals 30, 31 and 32 are the same as the identically numbered terminals shown in FIG. 1. The switch consists of an "Or" circuit 41, a pair of "And" circuits 42 and 43, and a bistable multivibrator 44.

The bistable multivibrator 44 has an input 45 and two outputs 46 and 47, respectively. Normally, with the switch in an operating state corresponding to that shown by the position of switch 29 in FIG. 1, the output 47 is connected to the tube of the multivibrator that is cut off and the output 46 is connected to the other tube of the multivibrator that is conducting heavily. Normally, therefore, the "And" circuit 43 is an open gate that will put out a pulse at the moment a positive pulse appears at terminal 31. On the other hand, normally the "And" circuit 42 is a closed gate that cannot put out any pulses even if positive pulses were to appear at terminal 30.

At the moment a positive position trigger input signal P of waveform B is applied to terminal 31, the "And" circuit 43 puts out a trigger pulse that appears at terminal 32 at the output of the "Or" circuit 41. The output of the "And" circuit is connected to the input 45 of the multivibrator 44, turning the cut off tube on and the "on" tube off. The waveform output at lead 47 falls suddenly, and the "And" circuit 43 becomes a closed gate instantaneously. However, because the waveform output of the multivibrator at lead 46 rises abruptly, the "And" circuit 42 becomes an open gate which can pass pulses of waveform I appearing at the terminal 30.

In operation of the system shown in FIG. 1, assume that the switches 22 and 29 are in the operating states shown by the drawings and that it is desired to remember the delay or time difference T between a reference pulse of waveform A and a position trigger P received by the input 31. The position trigger might be an echo pulse from a radar target whose range is desired to be remembered, for example. If so, the timer is synchronized with the timer which determines the time of the transmitter pulse of the radar system.

The waveform B shows a single position trigger P, the two dotted line configurations P′ and P″ being the subsequent positions of this trigger if repeated. The position trigger might be the last received of a series of position triggers, for example.

The position trigger P is inserted into the feedback loop of the system with the switch 29 in the operating state shown by FIG. 1. The position trigger is of positive polarity, and has an amplitude that is sufficient to trigger the monostable gate generator 14. Upon triggering generator 14, the switch 29 opens the connection between the terminals 31 and 32 and closes the connection between terminals 30 and 32. This must be accomplished before the trigger P would have repeated itself in position P′. If the electronic switching means of FIG. 4 is used, this is readily done.

At the moment the gate generator 14 is triggered by the position trigger P, a pulse of waveform D is produced. The output of the gated detector 13, at this moment, equals the instantaneous amplitude of the sweep voltage of waveform C. The magnitude of this output, which is stored by the capacitor 15 of the gated detector, is proportional to the delay T between the position trigger P and the preceding reference pulse of waveform A.

If capacitor 15 were a perfect capacitor, the voltage thereacross would remain proportional to the delay T indefinitely. However, capacitors presently available in the art will lose their charge because of leakage.

An important aspect of the present invention for maintaining the output of gated detector 13 proportional to the delay T indefinitely, is the feedback loop comprising the comparator 21 and the coincidence circuit 24 which operates in conjunction with the phase locked gated stable frequency oscillator 25. This loop, together with the monostable gate generator 14, is used for periodically restoring the charge of the capacitor 15 so that the output of the gated detector 13 remains substantially constant and proportional to the delay T.

The feedback loop operates in the following manner. After the sweep voltage of waveform C has returned to zero following the charging of capacitor 15 by a position trigger pulse P, the sweep voltage rises again. When it equals the voltage across the capacitor 15, a pulse of waveform F is produced by comparator 21. The leading edge of this pulse occurs slightly before the repeat position P′ of the position trigger pulse because the inherent leakage of capacitor 15 results in a slight decrease in the voltage stored thereby. This decrease is evident from the waveform E. It is exaggerated, of course, and is very slight by the time the sweep voltage rises again, particularly if the period of this sweep voltage is very short.

Even though the leading edge of the pulse of waveform F is before the repeat position P′ of a trigger pulse, no output is produced by the coincidence circuit 24 until the leading edge of a positive half cycle of the oscillations from the gated stable frequency oscillator 25 has occurred. When an output is produced by the coincidence circuit, it triggers the monostable gate generator 14. The capacitor 15 of the gated detector 13 is recharged to a voltage that is proportional to a time delay T′ from a timing pulse of waveform A to the next pulse of waveform I.

As is apparent, the time delay T′ of the pulses of waveform I is substantially equal to the time delay T of the position trigger of waveform B. As long as the system remains in operation, the time delay T′ remains constant. Thus, the indicator 28 may be employed for ascertaining the position of the last received position trigger pulse for an indefinite period of time.

The accuracy and resolution of the foregoing circuit is a function of the stability of the gated oscillator 25 and the frequency of its oscillations. This frequency should be as high as possible for maximum resolution. The frequency is determined by the difference in the absolute magnitude of the voltage decay across the capacitor 15 of the gated detector from the minimum gated detector output voltage to the maximum output voltage.

For example, if the minimum voltage across capacitor 15 is five volts, where there is a one volt output per microsecond delay of the time interval T, the decay might be of the order of 0.1 volt until the next timing pulse of waveform A occurs. If the output for a maximum time interval is 50 volts, for example, the delay would be ten times as large, or one volt. The absolute difference in decay, therefore, is 0.9 volt, which is equivalent to 0.9 microsecond. Thus, for maximum resolution, the period of the oscillations produced by the oscillator 25 should be 0.9 microsecond.

It has been disclosed that the repetition period of the pulses of waveform A is constant. However, under certain circumstances, it may be desired to make this period random in nature, subject to certain limitations.

For example, the minimum repetition period of the timing pulses of waveform A is determined by the position of one timing pulse to the maximum time position of the target, or the maximum delay T of a position trigger pulse P which is to be remembered. The maximum repetition period is determined by the rate of decay of the capacitor 15 of the gated detector 13. This maximum period is a function of the range or time at which the magnitude of the decay of the voltage across capacitor 15 exceeds a value which represents a shift of one pulse at the output of the coincidence circuit 24. If the decay is zero, the maximum repetition period is infinite.

To use the circuit for remembering the amplitude of an input D.C. voltage signal applied to input 23, the switch 29 is made to close the connection between its terminals 30 and 32. It remains in this operating state. Then, the switch 22 is actuated momentarily for connecting the input of comparator 21 to the input 23. The capacitor 15 at the output of the gated detector 13 then charges to a voltage which equals the D.C. voltage signal upon input 23, because of the operation of comparator 21, coincidence gate 24, gate generator 14 and the gated detector 13. When switch 22 is returned to its original position for connecting the input of comparator 21 to the output of detector 23, the system remembers the D.C. input voltage signal across capacitor 15 indefinitely in substantially the same way as described above.

In the system described, the oscillator 25 is turned on synchronously with the leading edge of each of the timing pulses of waveform A. It remains on for nearly the entire period of the timing pulses, being off only for a short time prior to each timing pulse. Instead, the oscillator 25 might be turned on as above, but be turned off each moment a pulse of waveform I is produced that has been delayed by the time interval T′ from a previous timing pulse. Then, the number of oscillations produced by the oscillator 25 during the time interval T′ is a measure of this interval. Therefore, the number of oscillations is proportional to the delay of a position trigger input signal or the magnitude of a D.C. voltage input signal.

Since changes could be made both in the illustrated embodiments of the invention and the manner in which they are described without departing from the scope and spirit of the invention, it is to be understood that the invention is limited solely by the appended claims.

What is claimed is:

1. A memory circuit comprising first means for producing a recurrent sweep voltage, second means having a first input for responding to said sweep voltage and a second input for responding to an input signal pulse for producing an output that is related in amplitude to the instantaneous value of said sweep voltage at the moment said signal pulse is received, a gated stable frequency oscillator for producing a series of oscillations that are synchronized with said recurrent sweep voltage, and feedback means connected between the output and the second input of said second means for maintaining the output of said second means substantially constant in amplitude and proportional to the time delay between the beginning of a sweep and the moment said input signal pulse is received; said feedback means comprising a comparator for producing a pulse output at the moment said sweep voltage equals the output of said second means, and a coincidence circuit connected between the outputs of said comparator and said oscillator for producing a feedback pulse for application to said second input at the moment the output of said comparator falls within a portion of said oscillations having a predetermined polarity.

2. A memory circuit as defined by claim 1, including switch means for inserting said input signal pulse into said feedback means to produce the initial signal pulse that is received by said second input.

3. A memory circuit comprising a source of timing pulses, a generator for responding to said pulses for producing a recurrent sweep voltage that is synchronized with the timing pulses, means having a first input for responding to said sweep voltage and a second input for responding to a signal pulse for producing an output that is proportional in amplitude to the delay between said signal pulse and said timing pulses, and means including a gated stable frequency oscillator that is synchronized with said timing pulses for maintaining the output of said first named means substantially constant for an indefinite period of time; said last named means further including an amplitude comparator for comparing the sweep voltage and the output of the first named means for producing an output pulse at the moment the value of said sweep voltage equals the output of said first named means, and a coincidence circuit for responding to an output pulse from the amplitude comparator and the output of said gated frequency oscillator for feeding back a pulse to the second input of said first named means at the moment the output pulse of said comparator falls within a predetermined portion of the oscillations produced by said gated stable frequency oscillator.

4. A memory circuit as defined by claim 3, further including switching means between the output of said first named means and said comparator for momentarily interrupting the connection therebetween to insert into the comparator a D.C. input signal whose magnitude is to be remembered.

5. A memory circuit as defined by claim 3, further including switching means between the output of said coincidence circuit and the second input of said first named means for momentarily interrupting the connection therebetween to insert a trigger input signal whose delay relative to said timing pulses is desired to be remembered.

6. A memory circuit comprising a gated detector having first and second inputs and an output, a capacitor across the output of said gated detector, an amplitude comparator having first and second inputs and an output, the second input of said amplitude comparator being connected to the output of said gated detector, means for supplying a recurrent sweep voltage to the first inputs of said gated detector and amplitude comparator, said comparator producing an output pulse of narrow duration relative to the period of said sweep voltage at the moment said sweep voltage reaches a voltage across said capacitor, a phase locked stable frequency oscillator whose output is synchronized with said recurrent sweep voltage, the period of the oscillations produced by said oscillator being no larger than the duration of the output pulse of said amplitude comparator, a coincidence circuit for producing an output pulse corresponding to a portion of the output of said oscillator that has a predetermined polarity and occurs during an output pulse of said amplitude comparator, and means for connecting the output of said coincidence circuit to the second input of said gated detector.

7. A memory circuit as defined by claim 6, including switching means between the output of said coincidence circuit and the second input of said gated detector for momentarily opening the connection therebetween to insert a trigger input signal whose delay is to be remembered, the voltage stored by said capacitor being proportional to said delay.

8. A memory circuit as defined by claim 6, including switching means between the output of said gated detector and the input of said amplitude comparator for momentarily opening the connection therebetween to insert a D.C. voltage input signal whose magnitude is to be remembered, the voltage stored by said capacitor being proportional to the magnitude of said D.C. voltage input signal.

9. A memory circuit comprising a source of recurrent timing pulses, a sweep generator for producing a recurrent sweep voltage that is synchronized with said timing pulses, a gated detector having first and second inputs and an output, means for supplying said recurrent sweep voltage to the first of said inputs, means for supplying a first gate pulse to the second of said inputs for producing a memory voltage at the output of said detector, the magnitude of said memory voltage being related to the instantaneous value of said sweep voltage at the moment said first gate pulse is produced, means for comparing said memory voltage with said sweep voltage to produce a second gate pulse at the moment the amplitude of the sweep voltage equals the amplitude of said memory voltage, a stable frequency oscillator for responding to said timing pulses to produce a series of voltage excursions of the same polarity as said second gate pulse, the duration of said voltage excursions being very small relative to the period of said timing pulses, coincidence means for responding to said second gate pulse and said series of voltage excursions to provide an output pulse at the moment one of said voltage excursions coincides with said second gate pulse, a monostable gate generator having an input connected to the output of said coincidence means and an output connected to the second input of said gated detector for producing said first gate pulse in response to the output of said coincidence means, and switching means located in said circuit at a point between the output of said gated detector and the input of said monostable gate generator for momentarily supplying a D.C. voltage to said circuit which contains information to be remembered.

10. The memory circuit defined by claim 9, wherein said switching means is connected to the input of said monostable gate generator for supplying a D.C. pulse to said generator whose position relative to said timing pulses is to be remembered by said circuit.

11. The memory circuit defined by claim 10, wherein said switching means is connected to the input of said comparing means for supplying a D.C. voltage to said comparing means whose magnitude is to be remembered by said circuit.

12. The memory circuit defined by claim 9, further including an indicator connected to the output of said coincidence means for indicating the relationship between said timing pulses and the output of said coincidence means.

References Cited in the file of this patent

UNITED STATES PATENTS

| | | |
|---|---|---|
| 2,840,799 | Holt | June 24, 1958 |
| 2,852,769 | Plouffe | Sept. 16, 1958 |
| 2,997,694 | Thompson | Aug. 22, 1961 |

OTHER REFERENCES

Proceedings of Institution of Electrical Engineers, Part III, vol. 96, pp. 81–100, 1949 (by F. C. Williams et al.).